INVENTOR
LEONARD C. ROBERTS

BY *Adams + Bush*
ATTORNEYS

United States Patent Office 2,734,533
Patented Feb. 14, 1956

2,734,533
BAND SAW BLADES

Leonard C. Roberts, Atlanta, Ga.

Application July 6, 1951, Serial No. 235,423

1 Claim. (Cl. 143—133)

This invention relates to saws and has particular reference to band saw blades particularly designed for cutting meat.

One of the objects of the invention is to provide an improved type of band saw blade adapted to cut a kerf by splitting action, thereby reducing the amount of "saw dust" or cut away material which has to be cleaned off when such blades are used for cutting meat.

Another object of the invention is to provide an improved type of band saw blade, as above characterized, having all of its teeth in the plane of the blade and each tooth provided with a pointed tip, and with the blade slightly tapered from its toothed edge to the back edge to provide clearance as the blade passes through the kerf.

Other objects and advantages of the invention will appear in the specification when considered in connection with the accompanying drawing, wherein.

Figure 3:
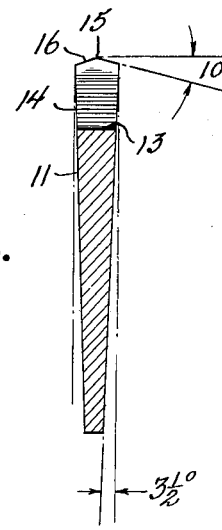
Fig. 3 is a sectional view taken on the line 3—3 of Fig. 1.

Referring more particularly to the drawing, there is shown a band saw blade 10, which is usually made of a strip of steel embodying the improved features of the invention. In accordance with the invention, the blade is slightly tapered from its toothed edge to its rear edge, as shown in Fig. 3, to provide clearance as it passes through a kerf. It is thinner at its back edge than at its toothed edge, and the clearance angle on each side is 2½° to 5°. It is contemplated that blades of this type can be rolled in the process of making them.

Figure 1:
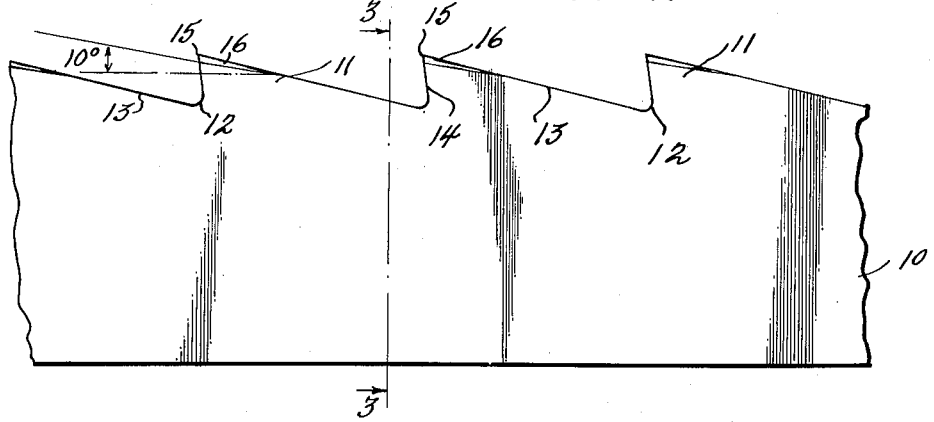
Fig. 1 is a fragmentary side elevation of a portion of a point of the blade embodying the invention.
Figure 2:
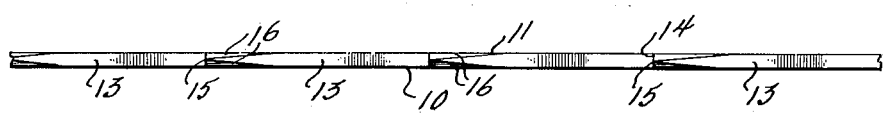
Fig. 2 is a fragmentary top plan view of the blade shown in Fig. 1.

Instead of providing the usual type of offset teeth, this invention provides angular teeth 11 which are all in the plane of the blade, so that successive teeth trail each other in making the kerf. While the teeth may be made in different shapes, they are preferably generally triangular, as best shown in Fig. 1, and are conveniently provided with rounded gullets 12, defined by straight trailing edges 13 and straight leading edges 14 of adjacent teeth, the leading edges being shown as being slightly inclined rearwardly and downwardly.

Figure 4:
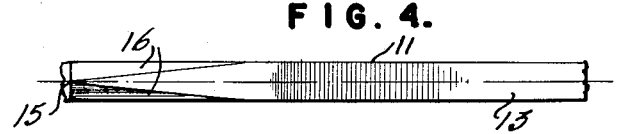
Fig. 4 is an enlarged top plan view of a single tooth.

In accordance with this invention, the tips of the teeth are all provided with splitting points 15 instead of cutting edges across their width, which is the thickness of the blade (Fig. 4). The pointed tips are located midway of the thickness of the blade and are preferably formed by grinding off or beveling the tip portions of the teeth at an acute angle to a plane perpendicular to the plane of the blade. In the illustrated example, the tips of the teeth have beveled facets 16 on opposite sides which are conveniently formed by feeding the blade at an acute angle to a grinding wheel, so that the facets extend from the leading edges of the teeth a distance of about one-third of the length of their trailing edges. The blade is preferably fed over a guiding roll past a grinding wheel which is set to grind the facets at an angle of from about 7½° to about 15° to a plane perpendicular to the plane of the blade. The grinding wheel is also tilted with respect to the blade to cause it to cut the facets at a slight angle to a plane at right angles to the tip along the trailing edges of the teeth, the angle being preferably about 10°, as will be seen in Fig. 1. This manner of grinding the facets on opposite side edges of the tip portions of the teeth eliminates the necessity for filing individual teeth to sharpen and re-sharpen them. The pointed tips can be sharpened in a single operation far more rapidly than is possible when employing ordinary filing machines.

In the operation of the blade, it will be understood that the pointed tips of the teeth will start a kerf by splitting action and the kerf will be enlarged by the thickest portions of the tips just below the beveled faces. The tapered blade provides adequate clearance for it to pass through the kerf formed by the teeth. Any fat which accumulates in the gullets is removed by rotating brushes or the like, after the blade passes through the meat. The arrangement of the teeth in the same plane greatly facilitates this brushing operation. Furthermore, the use of this type of blade eliminates great waste resulting from the use of offset teeth which make relatively wide kerfs in the meat.

Obviously, the invention is not restricted to the particular form thereof herein shown and described.

What is claimed is:

A band saw for cutting meat and the like, comprising a blade having angular teeth with all of the teeth in the plane of the blade, the tip portion of each of said teeth being beveled on opposite sides to provide a splitting point with the beveled portions forming small plane triangular facets extending from the tip portion of the leading edge of each tooth downwardly along the trailing edge for about one third of the length of the trailing edge and making an angle of about 10° with a plane at right angles to the plane of the blade.

References Cited in the file of this patent

UNITED STATES PATENTS

| | | |
|---|---|---|
| 604,603 | Caruthers | May 24, 1898 |
| 1,240,939 | Carlson | Sept. 25, 1917 |

FOREIGN PATENTS

| | | |
|---|---|---|
| 18,303 | Great Britain | Mar. 28, 1907 |